United States Patent
Kostadinovich (10) Patent No.: US 7,584,433 B2
(45) Date of Patent: Sep. 1, 2009

(54) EXTENDIBLE AND OPEN CAMERA CONNECTOR SYSTEM

(75) Inventor: Michael Kostadinovich, New York, NY (US)

(73) Assignee: AVP IP Holding Co., LLC., Delray Beach, FL (US)

( * ) Notice: Subject to any disclaimer, the term of this patent is extended or adjusted under 35 U.S.C. 154(b) by 409 days.

(21) Appl. No.: 11/261,237

(22) Filed: Oct. 28, 2005

(65) Prior Publication Data

US 2006/0242677 A1  Oct. 26, 2006

Related U.S. Application Data

(60) Provisional application No. 60/673,281, filed on Apr. 20, 2005.

(51) Int. Cl.
*G06F 13/00* (2006.01)
*G06F 15/00* (2006.01)

(52) U.S. Cl. ..................... 715/763; 715/202

(58) Field of Classification Search ......... 715/763–765, 715/840, 843, 851–853, 854, 700, 202, 741–745; 709/205, 229

See application file for complete search history.

(56) References Cited

U.S. PATENT DOCUMENTS

| | | | | |
|---|---|---|---|---|
| 5,872,923 | A * | 2/1999 | Schwartz et al. | 709/205 |
| 6,535,240 | B2 * | 3/2003 | Yang et al. | 348/14.08 |
| 6,877,134 | B1 * | 4/2005 | Fuller et al. | 715/202 |

* cited by examiner

*Primary Examiner*—Kevin Nguyen
(74) *Attorney, Agent, or Firm*—Blank Rome, LLP (57) ABSTRACT

An extendable and open camera connection (XOCC) system for use with IP video camera applications. The XOCC system comprises an application framework and multiple, custom-built digital video content source drivers. The framework comprises an API which enables a client application to send to the API standardized requests for access, manipulation and content consumption for any type of camera, a driver manager which manages registration of all available drivers and establishes a reference within the API to a specific requested or selected driver for use by the API in processing client requests involving a camera associated with that driver, and a driver container for storing the registered drivers. The drivers comprise camera control modules developed for use by the XOCC system for control of associated cameras. The invention comprises not only the inventive application but its method of development, which includes libraries of both framework and driver development code.

20 Claims, 5 Drawing Sheets

EXTENDIBLE AND OPEN CAMERA CONNECTOR SYSTEM

RELATED APPLICATIONS

This application claims the benefit of U.S. Provisional Patent Application No. 60/673,281 filed on Apr. 20, 2005.

FIELD OF THE INVENTION

The present invention relates to the field of remote video camera operation. More specifically, the present invention is a universal, vendor/model-independent remote video camera access and operations management system.

BACKGROUND OF THE INVENTION

With increasing security needs, the use of video cameras in various types of surveillance is becoming increasingly important. Video surveillance is typically a part of many aspects of most businesses. However, due to the variety of camera types on the market, a "surveillance coordination" problem has developed when businesses either merge, or when they outsource video surveillance to third parties. The combining of several types of cameras has made centralized surveillance a complicated and costly operation to setup.

This is because typically, network-based video camera operations link a camera type (make and model) with a special-purpose remote access, manipulation and monitoring control system developed specifically for that camera type. The IP camera control system generally comprises a client application developed for a particular user device. The client application is also generally created specifically for that particular camera.

Figure 1:
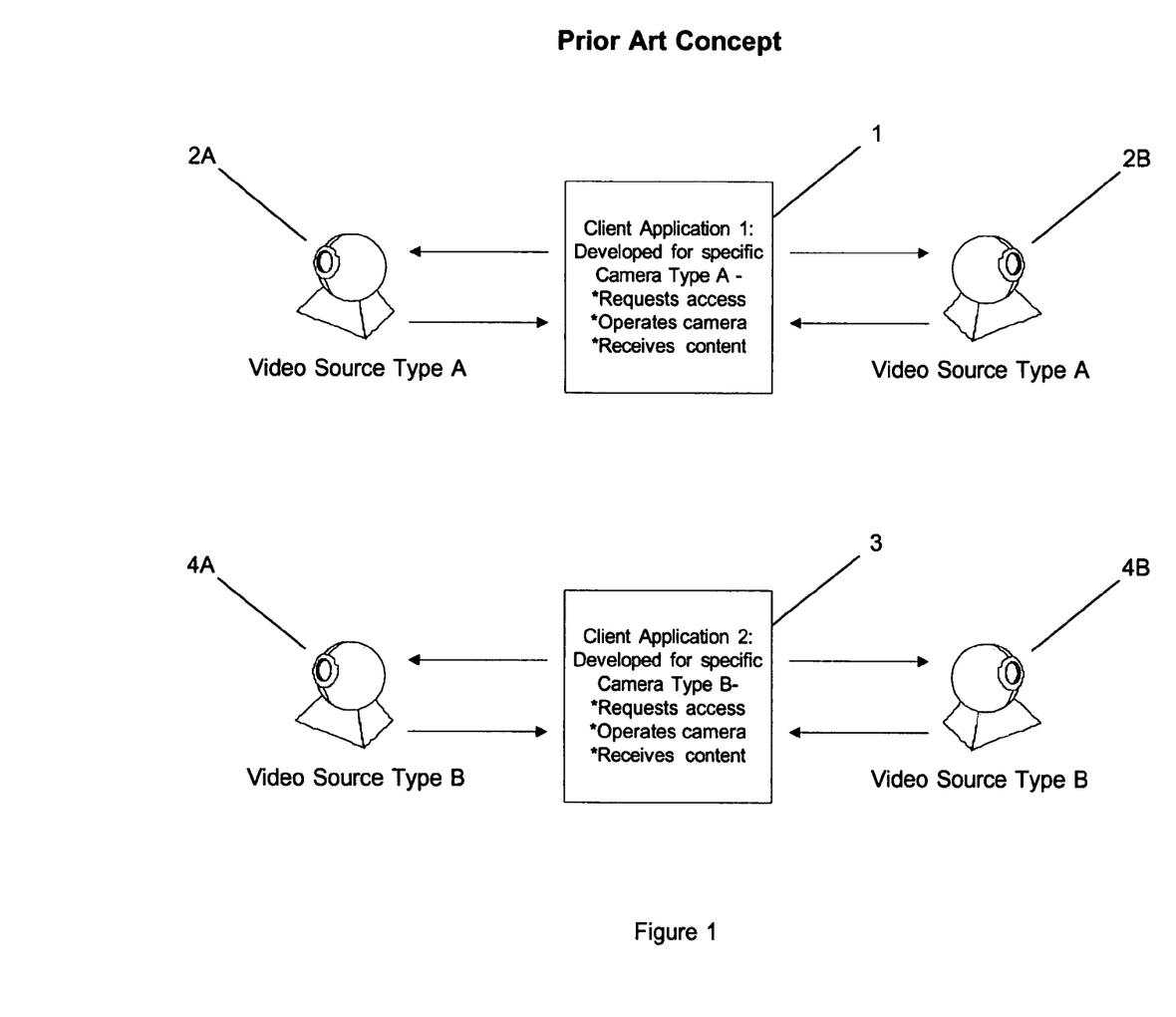
FIG. 1 is a network diagram illustrating prior art implementations of client applications involving multiple IP camera types.

A conceptual model of a prior art network video application is shown in FIG. 1. In the figure, a client application 1 is created specifically for a particular type of camera 2; Type A, of which there are two cameras 2A and 2B being utilized as part of a surveillance system covering two different locations. That application permits the user to request access to either or both cameras, operate them, for example to pan or zoom the view, and receive content from them, for example, in the form of video images. If additional but different type cameras, for example Type B, shown as 4A and 4B, are to be added into the system, a completely new application 3 would have to be written to support the new units. While this would increase the surveillance capacity of the overall system, neither of the applications would be able to communicate with the other's cameras, an inefficient and undesirable effect.

As shown above, adding a new camera type to an existing surveillance system is cumbersome. Combining several diverse monitoring operations into a single, seamless surveillance system, as might be required during a merger of two companies, would increase the difficulty many times over. The consolidation of a group of systems would be very time consuming and potentially very costly for system managers. Therefore, there is clearly a need for improvement in methods for integrating diverse camera operation systems.

SUMMARY OF THE INVENTION

While traditional video surveillance has been performed using conventional, CCTV analog cameras, advances in video technology have produced a new product group comprising network (or IP) video cameras. These products, which offer system developers an opportunity to improve the flexibility, accessibility and coordination of diverse remote monitoring systems have not been adequately incorporated into such systems.

As a way to address the integration difficulties stated above, an extendable and open remote video camera connection (XOCC) system is disclosed, which, in conjunction with a client application permits the access, manipulation and monitoring of any type of network digital video content source (DVCS), e.g., network video cameras, USB cameras, live internet audio/video streams, web-enabled digital video recorders, etc., by that client application. The system comprises an XOCC framework and at least one XOCC driver.

An XOCC driver (a "driver") is a custom-built DVCS interface module written to extend the control of a network video source, for which the driver is written, to a remote client application which functions to access, consume or manipulate the content provided by the source. The client's control is implemented via the XOCC framework. Each driver is written specifically for the type of DVCS it controls and interfaces with elements of the framework.

The XOCC framework comprises a client-to-driver API, a driver manager and a driver container. The API provides an abstraction layer to a client's operation of a remote video source device. It permits a single client application to interface with diverse DVCS types, via their respective drivers, in such a way that the client sees no difference between DVCS/driver types in the control of the remote video source. The driver container is a storage area for drivers which are available to the system running the client application. The driver manager is a program component which manages the access and delivery of the appropriate stored driver for a given video source requested by the client.

All that is required to integrate diverse surveillance systems is: 1) the XOCC framework and 2) an XOCC driver for each DVCS type in each surveillance system. In essence, the XOCC system functions by having the client application access the XOCC API, which in turn accesses the XOCC-compatible video source driver, which then accesses the driver-specific video source. The abstraction occurs within the XOCC framework, which receives a request from the client, interprets it in light of the environment of the request and accesses the appropriate driver for the request. The XOCC API then addresses the request to the driver, which then acts on the video source. All this happens seamlessly to the user. Further, the layer of abstraction between the content producer (i.e., the DVCS) and the content consumer (e.g., end user applications or devices used for content recording, etc.), ensures video source and client application-independent communication from the consumer's side. That is, a client application designed to work with camera X will also work with camera Y, provided both camera driver types are available to the system.

The XOCC system is designed to allow the client application to 1) facilitate manipulation of the video source (i.e., moving the camera, in the case of a PTZ camera; setting media parameters: quality, format, etc.), 2) access the video media produced by the source, and 3) to provide the client application with a set of generic interfaces allowing retrieval of detailed information about the video source (e.g., current position, current frame rate, comments, event notifications, media format, available features, etc.). This invention is video source, client application, protocol and computer language-independent and can thus be potentially used with virtually any technology available in the industry.

The Driver Manager is the center-piece and entry of the XOCC system framework. At start time the driver manager examines the environment and determines which drivers are available for use. Available drivers are loaded and registered making them ready for use.

The client application accesses the driver manager and either asks the driver manager which drivers are available or directly asks the manager to provide a specific driver (e.g., the driver for vendor "Sony", model "XCST10") for a targeted video source.

Once the application accesses the correct driver, it uses XOCC interfaces to learn about the source: parameters needed to establish a connection, format of the coordinates, format of the media returned, available features etc.

Besides being designed to handle communication with PTZ and non-PTZ network cameras, XOCC has built-in capabilities for handling any video source available over the network or other digital mediums accessible from the environment on which the client applications are installed.

Both the XOCC system components and the XOCC drivers are developed using libraries of XOCC framework development code. The drivers may either be developed by integrators during the XOCC system development or the drivers may be added later as more DVCS devices are added to the client application's network.

BRIEF DESCRIPTION OF THE DRAWINGS

Exemplary embodiments of the invention are discussed hereinafter in reference to the following drawings, in which.

DETAILED DESCRIPTION OF PREFERRED EXEMPLARY EMBODIMENTS

Figure 2:
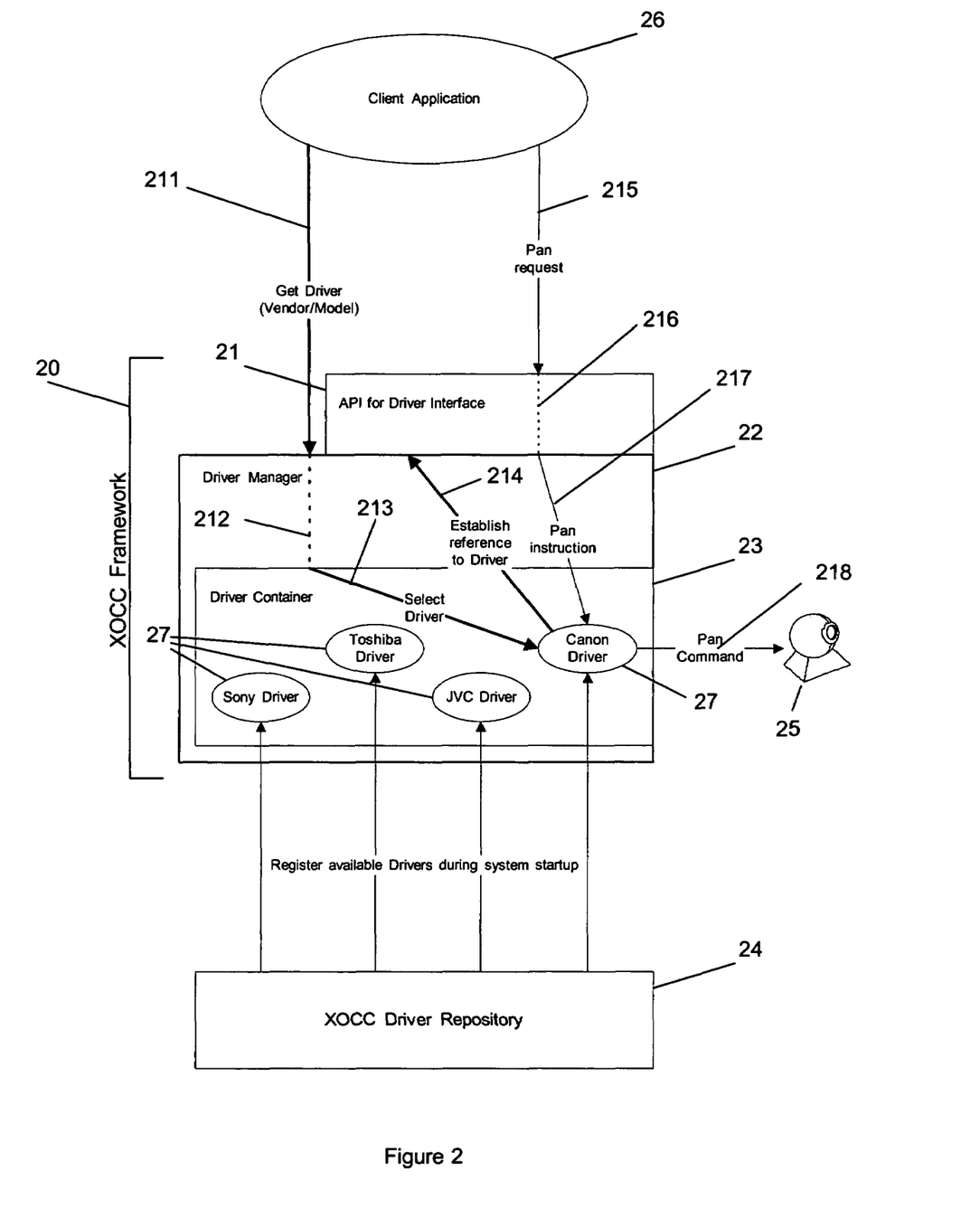
FIG. 2 is a schematic depicting the XOCC framework, drivers and their interaction with a client application controlling a network video device.

The XOCC system of the present invention comprises an XOCC framework (the "framework") and at least one XOCC driver (a "driver"). As is illustrated in FIG. 2, the framework 20 comprises an XOCC API 21, a driver manager 22 and a driver container 23 operating as part of the driver manager. The XOCC framework operates in conjunction with a client application 26, from which a user may control a web-based system of digital video content sources (DVCS) 25. The DVCS comprise, for example, network video cameras, USB cameras, live internet audio/video streams, web-enabled digital video recorders, etc.

Drivers 27 comprise custom-built DVCS device control modules which are designed to interface with the XOCC API (rather than the client application) in controlling a specific make and model of DVCS device. They receive instructions from the API, which is operating under the direction of a client application which, in effect is utilizing the XOCC framework as an integrated extension of itself. The drivers facilitate access to, manipulation of, retrieval of operational information from and retrieval of video content from the DVCS devices they directly control. They operate in much the same manner as typical device drivers do, interfacing with an operating system to facilitate control of the device, however, these XOCC drivers are available for IP video source devices. They may be designed by either XOCC system integrators or DVCS device manufacturers, in either case, utilizing XOCC application development libraries, which will be described further hereunder. The drivers reside in a driver repository 24 until called into the driver container by the driver manager for registration and use, all of which is explained below.

Figure 3:
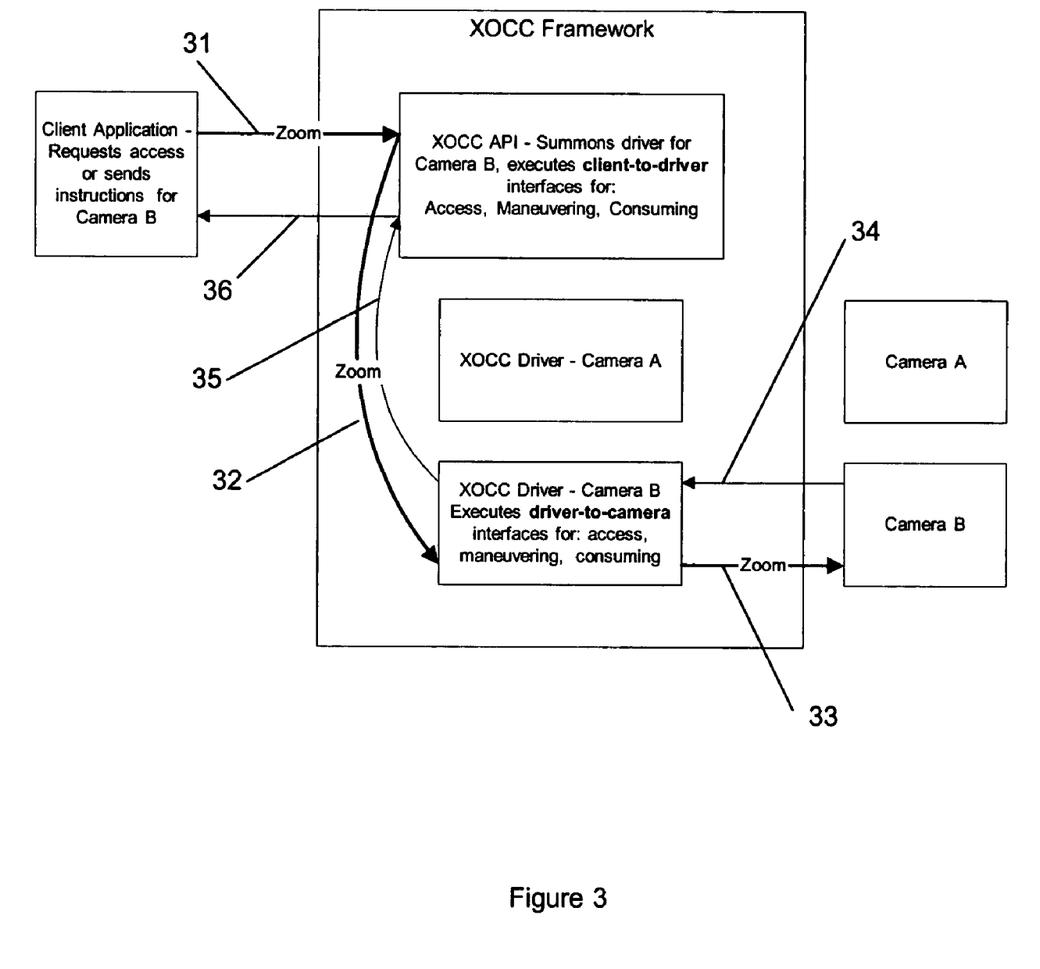
FIG. 3 is a functional diagram depicting the integrated use of an application augmented with the XOCC system in processing client requests associated with control of a network video device.

The XOCC API 21 is created by the application developer, also from libraries as referred to later on, to provide a functional abstraction layer between the client application and the DVCS drivers. FIG. 3 shows conceptually how the API functions to assist the client in working with a variety of drivers by accepting instructions from the client for a particular DVCS and interfacing with the DVCS drivers to implement those instructions.

In an exemplary embodiment, as depicted in FIG. 3, a client first sends an instruction (line 31) for a "zoom" operation of Camera B to the API. The zoom instruction coming from the client application is generic. That is, the client issues the same instruction to the XOCC API regardless of the device being accessed by the application. The API interprets the request and makes an interfacing call (line 32) to the driver for Camera B to have the request executed. Because of the abstraction provided by the API, the client does not know which type of DVCS device it is trying to access. It simply communicates its generic request to the API, which in turn communicates with the appropriate driver, as referred to the API by the driver manager. The driver receives the API instruction and sends a DVCS-friendly command to the associated DVCS device. In the example above, the driver sends a camera-friendly zoom instruction (line 33) to Camera B.

In another exemplary embodiment, the client instruction (line 31) may be a request for camera information, which is subsequently returned to the client by the system. For example, instead of a request to zoom, the client may send a request to know the current position of the camera. The request is passed from the API to the driver (line 32) and from the driver to the camera (line 33). In response to the request, Camera B returns its current position (line 34) to the driver, which returns it (line 35) to the API, which returns it (line 36) to the client.

Driver container 23 comprises a storage area, accessible by the driver manager which is used for storing XOCC drivers registered by the manager. The storage area may be in memory, on a hard disc, etc. The nature of the interface between the storage container, the XOCC API and the driver manager is explained below.

Figure 4:
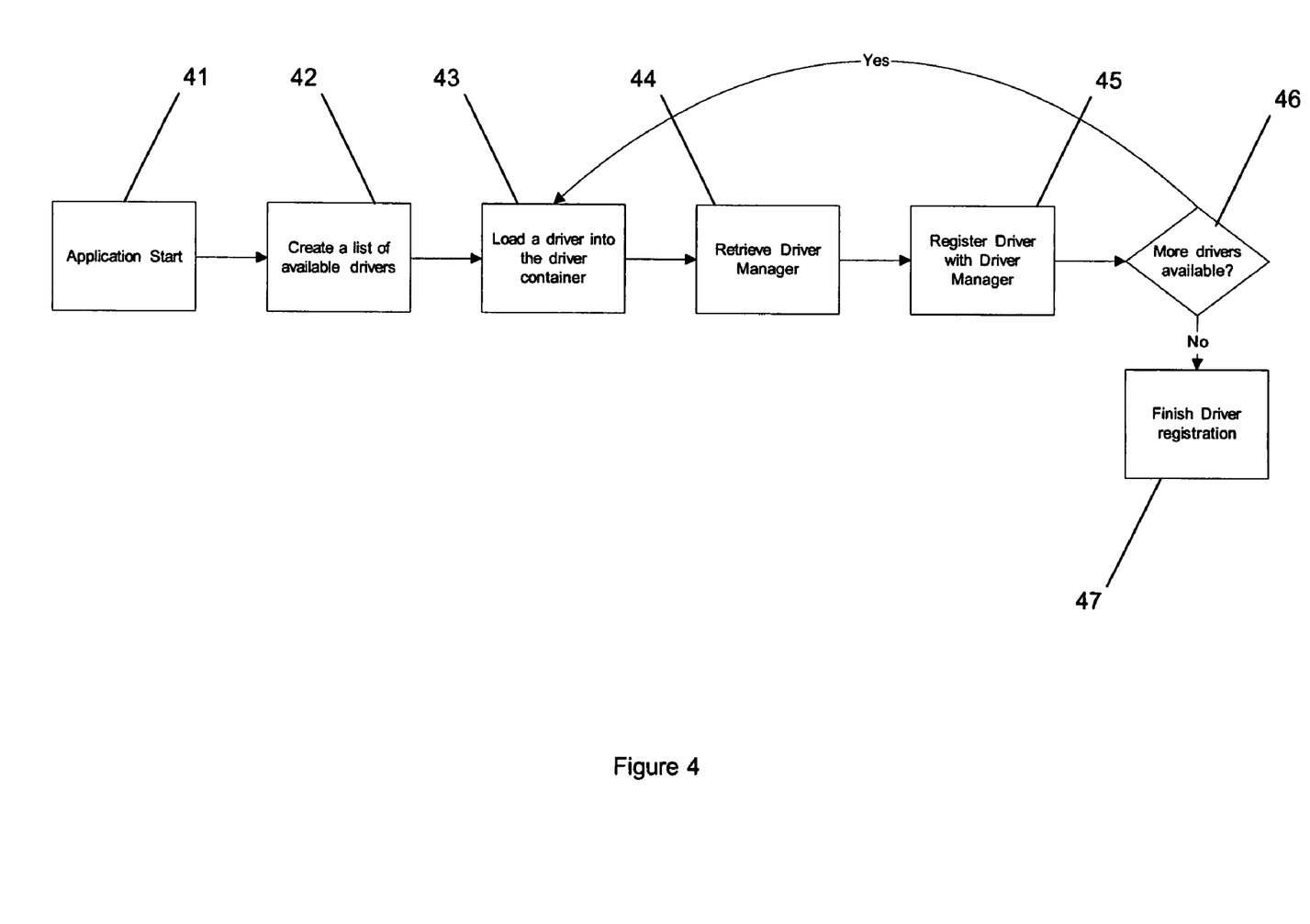
FIG. 4 is a flowchart showing the XOCC driver registration process for all drivers available to the system.

The driver manager 22 comprises a program component within the XOCC framework which interfaces with the XOCC API 21, the client application 26 and its own driver container 23 to register and return drivers stored on the system for use by the application at the request of the client. As shown in FIG. 4, the driver registration process begins with the start of the application (step 41). Once started, the application will create a list of drivers available to the XOCC system (step 42). This list may be generated from configuration files, from the current environment, from the end user, from the application server, or elsewhere. A repository 24 of available drivers is shown schematically in FIG. 2. Next, one of the listed drivers is loaded into the storage container (step 43). The application will then retrieve the driver manager (step 44) and the driver manager will register the stored driver (step 45). Then the system will check to see if there are additional drivers available for use (step 46). If there are, the process repeats itself from step 43. If there are no more un-registered drivers, the registration process is finished (step 47). At this point, all drivers which have been created for the XOCC-enhanced application are loaded, registered and ready for use. The method of their usage is described below.

Figure 5:
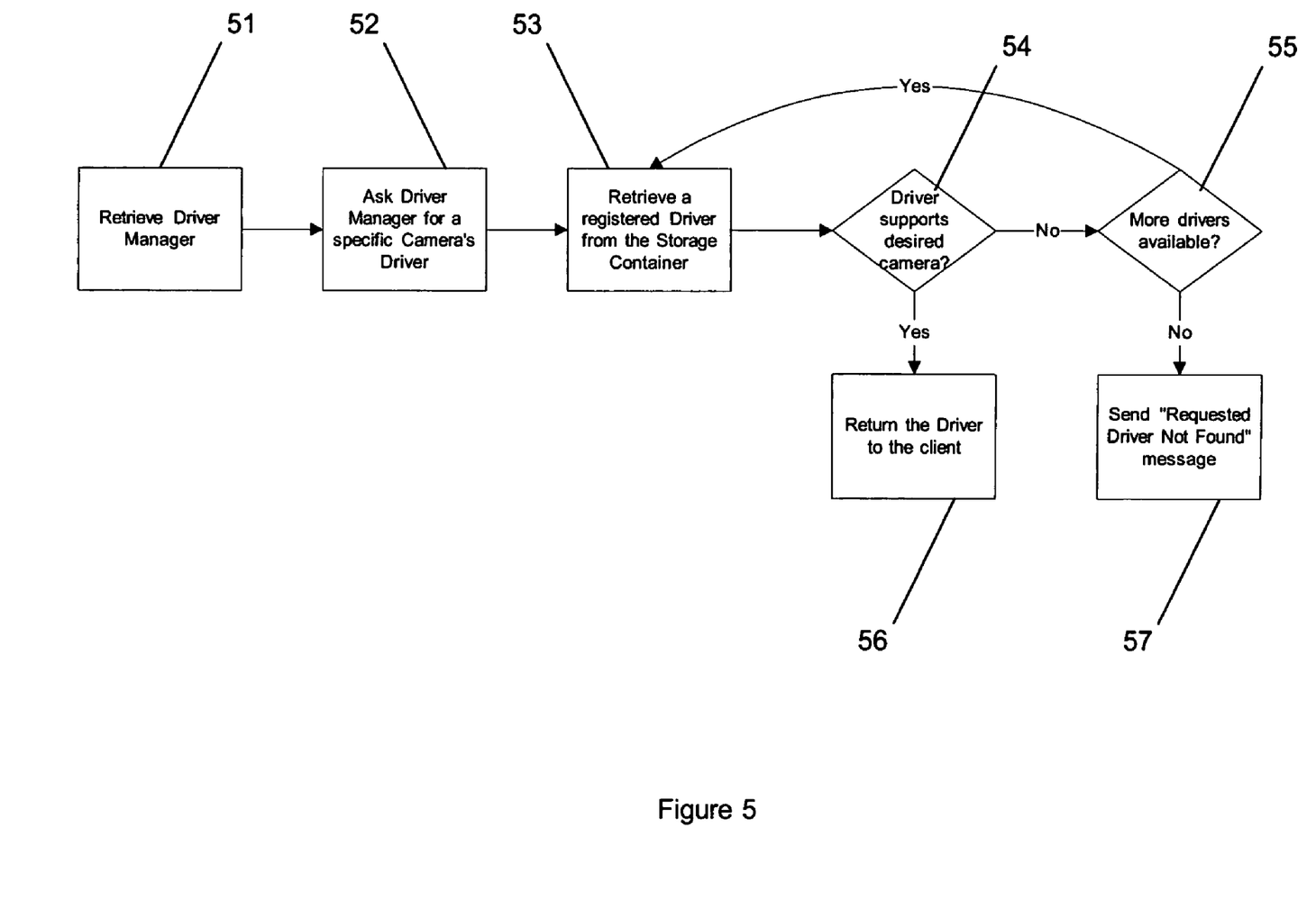
FIG. 5 is a flowchart showing the process of associating a compatible registered driver with a client application in response to a request to access a specific camera.

With all drivers 27 loaded into the storage container 23 and registered with the driver manager 22, the client application is able to access, manipulate and consume content from any DVCS devices within the application 26. FIG. 5, depicts the process of associating a client application with a specific registered driver for a specific system camera. In step 51, at the request of the client for access a system camera, the system retrieves the driver manager 22. In step 52, the application asks the driver manager to call up a registered driver. The driver manager retrieves a driver from the storage container (step 53) and in step 54, checks to see if that driver supports the operation of the requested camera. If it does not, the process moves to step 55, wherein the driver manager checks to see if more registered drivers are available. If there are, the process reverts to step 53 to retrieve another driver. If in step 54 the retrieved driver does support the desired camera, the process passes to step 56 where the manager returns (i.e., establishes a reference for) the current driver to the client. If in step 55, the driver manager finds no acceptable drivers, it returns an error message (step 57) to the client.

Functionally, the operation of the XOCC system with respect to camera access and camera control is shown schematically in FIG. 2. The schematic depicts a request by the client application to access a Canon camera 25. The request comes in the form of a Get Driver instruction (line 211) to the driver manager 22. The driver manager proceeds through the driver selection process of FIG. 5 (line 212), ultimately selecting the Canon driver (line 213) as the driver to associate with the client. The driver manager then returns the Canon driver by establishing a reference to that driver (line 214) with the API 21. The API is now ready to receive requests from the client application for control of the Canon camera.

Camera control operation is demonstrated by following the process of a camera "pan" request in FIG. 2. The application initiates the request (line 215) as a generic request to the API 21. The API processes the request (line 216) into a pan instruction (line 217) which will be understood by the Canon driver. The Canon driver then generates a pan command (line 218) to the Canon camera.

The invention comprises not only the XOCC framework and driver concepts, but includes the method of their development, as well. The XOCC system may be integrated into a developer's application through a set of libraries. There is one library for the framework creation and another for driver development. It is not necessary to install all drivers during framework development. The drivers may be created and integrated later as diverse surveillance system mergers occur or as different camera types are added to a single system due to expansion, attrition, etc.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

The invention claimed is:

1. A network video access, manipulation and monitoring control system comprising:
   at least one digital video content source (DVCS);
   a client application, wherein:
      said client application facilitates control of said at least one DVCS by a user of said system;
   a plurality of drivers, wherein:
      for each of said at least one DVCS a compatible driver is automatically selected from said plurality of drivers,
      said at least one DVCS is operatively associated with said compatible driver, creating at least one driver-associated DVCS; and
   a framework interacting with said client application through a DVCS and driver-independent interface and possessing an operative association with said compatible driver and with said at least one driver-associated DVCS, wherein:
      said operative association of said framework with said compatible driver and with said at least one driver-associated DVCS providing said client application through said DVCS and driver-independent interface with said control of said at least one driver-associated DVCS via said compatible driver.

2. The system of claim 1 wherein said at least one digital video content source (DVCS) are network video cameras, USB cameras, live internet audio/video streams, or web-enabled digital video recorders.

3. The system of claim 1 wherein said at least one DVCS comprises network video cameras, USB cameras, live internet audio/video streams, or web-enabled digital video recorders.

4. The system of claim 1 wherein said each of said plurality of drivers comprises:
   a logical program module, custom-built for association with said framework, enabling said control of said at least one driver-associated DVCS by said framework via said at least one driver, wherein:
      said operative association of said framework with said compatible driver comprises:
         receiving processed instructions from said framework, wherein:
            said processed instructions comprise:
               control commands received by said framework from said client application which are processed by said framework for use by said compatible driver on said at least one driver-associated DVCS.

5. The system of claim 4 wherein said framework comprises:
   a client-to-driver API operatively connected to,
   a driver manager, comprising:
   a driver container.

6. The system of claim 5, wherein said client-to-driver API provides a client application with a DVCS and driver-independent interface through which said client application may facilitate control of said at least one DVCS by a user of said system.

7. The system of claim 5 wherein said driver container comprises a storage location for loading at system startup said plurality of drivers, from which said driver manager has access to said plurality of drivers for registration of said plurality of drivers.

8. The system of claim 7 wherein said driver manager comprises a logical management system providing said registration of said plurality of drivers.

9. The system of claim 7 wherein said registration comprises said operatively association of said at least one DVCS with said compatible driver.

10. The system of claim 1 wherein said operative association between said compatible driver and said at least one DVCS comprises:

control communications between said compatible driver and said at least one driver-associated DVCS; and facilitation of control of said at least one driver-associated DVCS by said compatible driver, utilizing said control communications via said operative association of said framework with said compatible driver and with said at least one driver-associated DVCS.

11. The system of claim 1, wherein each of said plurality of drivers is capable of facilitating the control of a particular type of said at least one DVCS, and interfaces with said framework.

12. A network video control system, comprising:
a client application having a first operative association with a framework, said framework comprising:
   a client-to-driver API, comprising a driver-independent interface with said client application and having a second operative association with
   a driver manager having a third operative association with
   a driver container; and
   a plurality of drivers, which are registered and stored in said driver container,
at least one digital video content source (DVCS), wherein an indirect operative association is established between said client-to-driver API to said at least one DVCS via a driver automatically selected from said plurality of registered drivers by
   determining compatibility between said selected driver and each one of said at least one DVCS,
   associating said compatible driver with said at least one DVCS creating a driver associated DVCS; and
   establishing a reference to said compatible driver for said driver-associated DVCS with said client-to-driver API, wherein said client-to-driver API is independent of said at least one DVCS;
said indirect operative association permits control of said at least one DVCS by said client application.

13. The system of claim 12, wherein said first operative association comprises permitting said client application to abstractly execute, via DVCS-independent_instructions, said control over a diverse set of said at least one DVCS via said client-to-driver API.

14. The system of claim 12, wherein said second operative association comprises permitting said client-to-driver API to communicate with said driver manager.

15. The system of claim 12, wherein said third operative association comprises said registering of said compatible driver.

16. The system of claim 12, wherein said fourth operative association comprises enabling said compatible driver to facilitate execution of said control over said at least one driver-associated DVCS.

17. The system of claim 12, wherein each of said plurality of drivers is capable of facilitating the control of a particular type of said at least one DVCS, and interfaces with said framework.

18. The system of claim 12, wherein said client-to-driver API provides an abstraction layer that facilitates the control of said at least one DVCS by said client application.

19. A network video access, manipulation and monitoring control system comprising:
at least one digital video content source (DVCS);
a client application, wherein:
   said client application facilitates control of said at least one DVCS by a user of said system;
a plurality of drivers, wherein:
   for each of said at least one DVCS a compatible driver is automatically selected from said plurality of drivers,
   said at least one DVCS is operatively associated with said compatible driver, creating at least one driver-associated DVCS; and
a framework interacting with said client application through a DVCS and driver-independent interface and possessing an operative association with said compatible driver and with said at least one driver-associated DVCS, wherein:
   said operative association of said framework with said compatible driver and with said at least one driver-associated DVCS providing said client application through said DVCS and driver-independent interface with said control of said at least one driver-associated DVCS via said compatible driver; and
   said framework and said plurality of drivers are developed using respective libraries of application development code and wherein additional drivers are added to said plurality of drivers at any time.

20. A network video control system, comprising:
a client application having a first operative association with a framework, said framework comprising:
   a client-to-driver API, comprising a driver-independent interface with said client application and having a second operative association with
   a driver manager having a third operative association with
   a driver container; and
   a plurality of drivers, which are registered and stored in said driver container,
at least one digital video content source (DVCS), wherein an indirect operative association is established between said client-to-driver API to said at least one DVCS via a driver automatically selected from said plurality of registered drivers by
   determining compatibility between said selected driver and each one of said at least one DVCS,
   associating said compatible driver with said at least one DVCS creating a driver associated DVCS; and
   establishing a reference to said compatible driver for said driver-associated DVCS with said client-to-driver API, wherein said client-to-driver API is independent of said at least one DVCS;
said indirect operative association permits control of said at least one DVCS by said client application; and
wherein said framework and said plurality of drivers are developed using respective libraries of application development code and wherein additional drivers are added to said driver container at any time.

* * * * *

UNITED STATES PATENT AND TRADEMARK OFFICE
CERTIFICATE OF CORRECTION

PATENT NO.        : 7,584,433 B2                                              Page 1 of 1
APPLICATION NO.   : 11/261237
DATED             : September 1, 2009
INVENTOR(S)       : Michael Kostadinovich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 569 days.

Signed and Sealed this

Fourteenth Day of September, 2010

David J. Kappos
*Director of the United States Patent and Trademark Office*